A. D. GALLAGHER.
TRACTOR DRAWN PLOW.
APPLICATION FILED MAR. 10, 1919.
1,376,756.
Patented May 3, 1921.
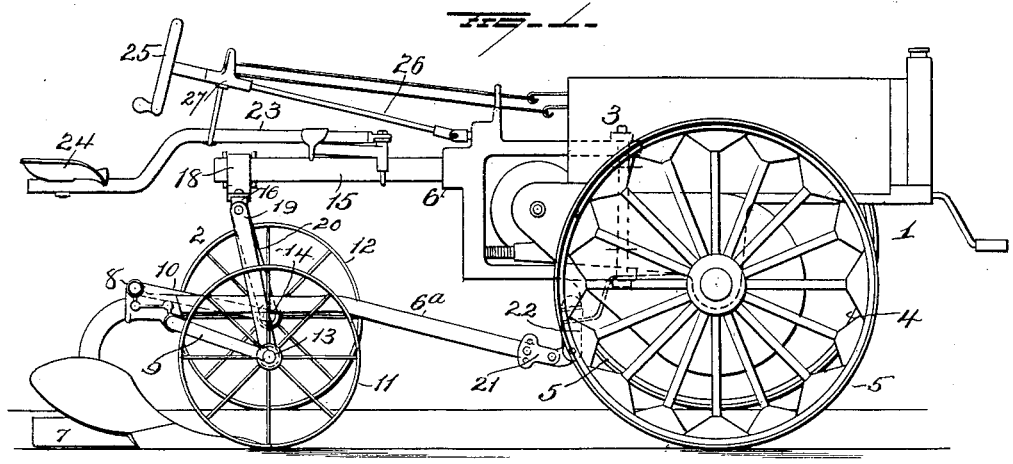
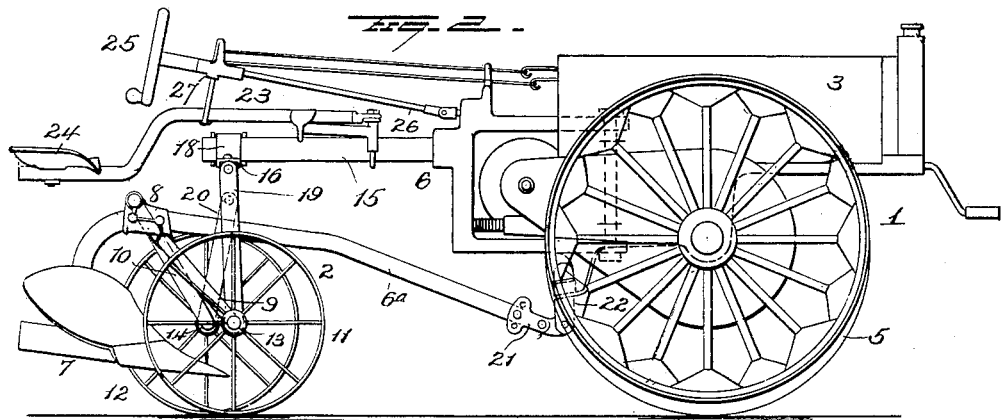
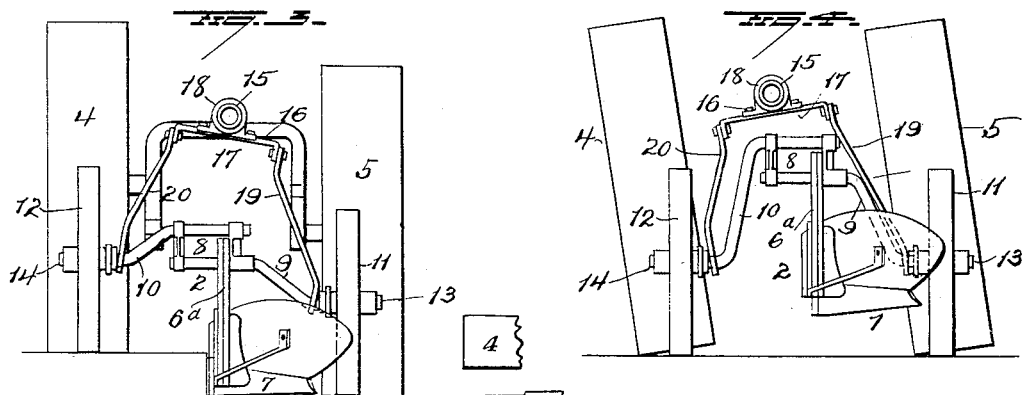
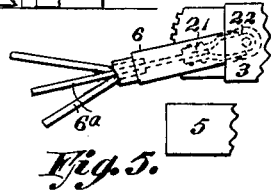

UNITED STATES PATENT OFFICE.

ARTHUR D. GALLAGHER, OF SOUTH BEND, INDIANA, ASSIGNOR TO OLIVER CHILLED PLOW WORKS, OF SOUTH BEND, INDIANA.

TRACTOR-DRAWN PLOW.

1,376,756.   Specification of Letters Patent.   Patented May 3, 1921.

Application filed March 10, 1919. Serial No. 281,585.

*To all whom it may concern:*

Be it known that I, ARTHUR D. GALLAGHER, a citizen of the United States, and a resident of South Bend, in the county of St. Joseph and State of Indiana, have invented certain new and useful Improvements in Tractor-Drawn Plows; and I do hereby declare the following to be a full, clear, and exact description of the invention, such as will enable others skilled in the art to which it appertains to make and use the same.

This invention relates to improvements in tractor-drawn plows,—one object of the invention being to associate a wheeled plow structure with a tractor in such manner that the weight of the rear portion of the tractor will be brought to bear upon the wheels of the plow structure, independently of the plow beam or frame of the plow structure.

A further object is to so connect a wheeled plow with a tractor and to mount the operator's seat in such position that the weight of the operator, added to that of the rear portion of the tractor, shall be brought to bear upon the wheels of the plow without subjecting the beam or frame of the plow structure to such weight.

A further object is to provide means whereby the weight of the rear portion of a tractor and the weight of an operator shall be brought to bear upon the spindle portions of the axles adjacent to the wheels of a wheeled plow connected with the tractor.

With these and other objects in view, the invention consists in certain novel features of construction and combinations of parts as hereinafter set forth and pointed out in the claims.

In the accompanying drawings; Figure 1 is a side elevation illustrating an application of my improvements with the plow in working position; Fig. 2 is a similar view with the plow in raised position; Fig. 3 is a rear view with the plow in working position; Fig. 4 is a rear view showing the plow in raised position and the tractor on level or unplowed ground, and Fig. 5 is a fragmentary view showing the connecting means between the plow beam and the tractor.

1 represents a two-wheeled tractor and 2 a plow structure connected therewith. The tractor may comprise a main body portion 3 mounted on wheels 4, 5, and a rear portion 6 so pivotally connected with the portion 3 as to permit of relative horizontal swinging movement, for steering purposes. The wheels of the tractor are so set that one of them will run in a furrow while the other will run on the unplowed ground, and thus the tractor will be maintained level while at work. If the plow is adapted to cut a six inch furrow, the wheel 4 of the tractor which runs on the unplowed ground will be set six inches higher than the wheel 5 which runs in the furrow. When the tractor is resting upon level or unplowed ground, the wheels of the tractor will assume the position shown in Fig. 4. With a tractor of the type illustrated, the motor (not shown) is located forwardly of the axis of the driving wheels and tends to counterbalance the weight of the rear portion of the tractor, and hence when the tractor and attached plow structure are at rest, there will be very little weight on the wheels of the plow structure, but when in motion, the driving gear of the tractor tends to pull downwardly on the rear portion of the tractor and the more power required to draw the plow, the heavier will be the load on the wheels of the plow structure. If this weight or downward pressure were brought to bear upon the plow frame or beam, there would be a tendency to spring the crank axle or axles of the plow structure and thus increase the depth which the bases would run in the ground,—or in other words, interfere with or change the "depth" adjustment of the plow. To avoid the possibility of such straining of the crank axles of the plow structure and the consequent changing of the desired "depth adjustment," my improvements contemplate the mounting of the rear portion of the tractor on the plow structure in such manner that the weight of said rear portion of the tractor and the weight of the operator will be brought to bear upon the spindle portions of the axles,—that is to say upon the axles close to the wheels.

The plow structure may comprise a plow beam $6^a$ provided with a plow base 7; a bearing bracket 8 secured to said plow beam; furrow and landside crank axles 9 and 10 mounted in said bracket, and furrow and land wheels 11, 12 mounted on the spindle portions 13, 14 of said crank axles. Any suitable mechanism for raising and lowering the plow beam and base and for effecting "depth" adjustments, may be provided, but as such features do not constitute part of my present invention, they need not be shown and described herein.

The rear portion 6 of the tractor may comprise in its construction, a rearwardly projecting bar 15 and to the rear portion of this bar, the cross member 16 of an arch 17 is loosely or pivotally connected by means of a bracket 18. The legs 19, 20 of the arch may be securely bolted at their upper ends to respective ends of the cross member 16 and the lower end portions of said legs are mounted on the crank axles 9—10 in close proximity to the wheels 11—12. That is to say, the lower portions of the legs of the arch are mounted on the lower horizontal or spindle portions 13—14 of the axles. By pivotally connecting the arch with the rearwardly projecting bar of the tractor as above explained, the plow structure will be permitted to accommodate itself to the condition of the ground over which it travels.

The forward end of the plow beam is pivotally connected, through the medium of a clevis 21, with the lower end of a link 22, the latter being vertically disposed and revolubly connected with the tractor in line with the pivotal connection between the two parts thereof, so that when the steering mechanism of the tractor is operated to change the direction of travel, the plow structure will be permitted to properly trail and follow the course of the tractor.

A seat bar 23 is mounted upon the rearwardly projecting bar of the tractor and carries an operator's seat 24. The steering wheel 25 and its shaft 26, as well as the control devices for the tractor may be supported by a bracket 27 supported above the seat bar, and these devices are thus located within convenient reach of the operator.

With my improvements, the rear end of the tractor and the operator are supported by the wheels of the plow structure in such manner that the cranks of the axles will be relieved of all torsional strain and "depth" adjustment will not be interfered with or changed, thus insuring uniformity of depth of plowing. Furthermore, the plow will readily trail the course of the tractor without subjecting either to torsional strains, and the plow structure can readily accommodate itself to the contour of ground, and again, the plow beam and base may be raised, lowered and adjusted, independently of and without tilting or otherwise imparting movement to any part of the tractor.

Having fully described my invention what I claim as new and desire to secure by Letters-Patent, is:

1. The combination with a tractor and a wheeled plow connected therewith, of means supporting the rear portion of the tractor on the spindles of the wheeled plow adjacent to the wheels on the spindles.

2. The combination with a tractor, and a wheeled plow comprising a beam, crank axles having spindle portions, mountings for said crank axles, and wheels on said spindle portions of the crank axles, of means for supporting the rear portion of the tractor on said spindle portions of the crank axles.

3. The combination with a tractor, and a wheeled plow comprising a plow beam, crank axles provided at their lower ends with horizontal portions, and wheels on the horizontal portions of the crank axles, of an arch connected with the rear portion of the tractor and mounted on said horizontal portions of the crank axles.

4. The combination with a tractor including a rearwardly projecting bar, and a wheeled plow, of an arch pivotally connected with said bar and mounted on the axles of the wheeled plow adjacent to the wheels thereof.

5. The combination with a tractor comprising a body portion and a rearwardly projecting portion pivoted thereto, of a wheeled plow having a beam, a vertical pivot for the forward end of said beam in line with the pivotal connection between the two portions of the tractor, and means for supporting the rear portion of the tractor on the wheels of the wheeled plow.

6. The combination with a two-wheeled tractor in which the motor is located forwardly of the axis of the wheels and having a rearwardly projecting portion, and a wheeled plow, of means connected with said rearwardly projecting portion of the tractor and mounted on the spindles of the wheeled plow adjacent to the wheels mounted on said spindles.

In testimony whereof, I have signed this specification in the presence of two subscribing witnesses.

ARTHUR D. GALLAGHER.

Witnesses:
EDWIN NICAR.
GEORGE LANPHERE.